(12) United States Patent
Hart et al.

(10) Patent No.: US 10,952,156 B2
(45) Date of Patent: Mar. 16, 2021

(54) AUGMENTING A NEIGHBOR REPORT WITH UPLINK RECEIVED SIGNAL STRENGTH INDICATORS (RSSI) FROM SCANNING RADIOS

(71) Applicant: Cisco Technology, Inc., San Jose, CA (US)

(72) Inventors: Brian D. Hart, Sunnyvale, CA (US); David Kloper, Santa Clara, CA (US); Pooya Monajemi, Irvine, CA (US); Vishal S. Dasai, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/421,175

(22) Filed: May 23, 2019

(65) Prior Publication Data

US 2020/0374810 A1    Nov. 26, 2020

(51) Int. Cl.
| | |
|---|---|
| *H04W 52/24* | (2009.01) |
| *H04W 36/30* | (2009.01) |
| *H04B 17/318* | (2015.01) |
| *H04W 52/14* | (2009.01) |
| *H04W 24/10* | (2009.01) |
| *H04W 52/34* | (2009.01) |

(52) U.S. Cl.
CPC ......... *H04W 52/245* (2013.01); *H04W 24/10* (2013.01); *H04W 52/146* (2013.01); *H04W 52/241* (2013.01); *H04W 52/343* (2013.01); *H04B 17/318* (2015.01)

(58) Field of Classification Search
CPC ....... H04W 36/0083; H04W 36/00835; H04W 24/10; H04W 36/30; H04W 36/0058; H04W 24/02; H04W 36/08; H04W 36/0061; H04W 48/16; H04W 84/12; H04W 84/18
USPC .......... 455/522, 67.11, 67.13, 423, 424, 425, 455/446, 524, 525
See application file for complete search history.

(56) References Cited

U.S. PATENT DOCUMENTS

| | | | |
|---|---|---|---|
| 8,700,083 B2 | 4/2014 | Yavuz et al. | |
| 9,014,376 B2 | 4/2015 | Yao et al. | |
| 2006/0268756 A1 | 11/2006 | Wang et al. | |
| 2017/0171833 A1 | 6/2017 | Vamaraju et al. | |
| 2017/0280337 A1 | 9/2017 | Bahr | |
| 2019/0281485 A1* | 9/2019 | da Silva | H04B 17/318 |
| 2019/0380083 A1* | 12/2019 | Stauffer | H04W 36/0077 |

* cited by examiner

*Primary Examiner* — Philip Sobutka
(74) *Attorney, Agent, or Firm* — Merchant & Gould P.C.

(57) ABSTRACT

Augmenting a neighbor report with uplink Received Signal Strength Indicators (RSSIs) may be provided. First, a conducted transmit power value of a client device may be determined. A plurality of RSSI uplink values respectively corresponding to a plurality of Access Points (APs) may then be determined. Next, a plurality of RSSI downlink values respectively corresponding to the plurality of APs may be determined based on the respective plurality of RSSI uplink values, a respective plurality of conducted transmit power values corresponding to the plurality of APs, and the conducted transmit power value of the client device. A plurality of quality metrics respectively corresponding to the plurality of APs may then be determined based on the determined plurality of RSSI uplink values and the determined plurality of RSSI downlink values. Then, a neighbor report may be optimized based on the plurality of quality metrics.

20 Claims, 3 Drawing Sheets

AUGMENTING A NEIGHBOR REPORT WITH UPLINK RECEIVED SIGNAL STRENGTH INDICATORS (RSSI) FROM SCANNING RADIOS

TECHNICAL FIELD

The present disclosure relates generally to providing neighbor reports.

BACKGROUND

In computer networking, a wireless Access Point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a wireless local area network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless access point, network users are able to add devices that access the network with few or no cables. An AP normally connects directly to a wired Ethernet connection and the WAP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
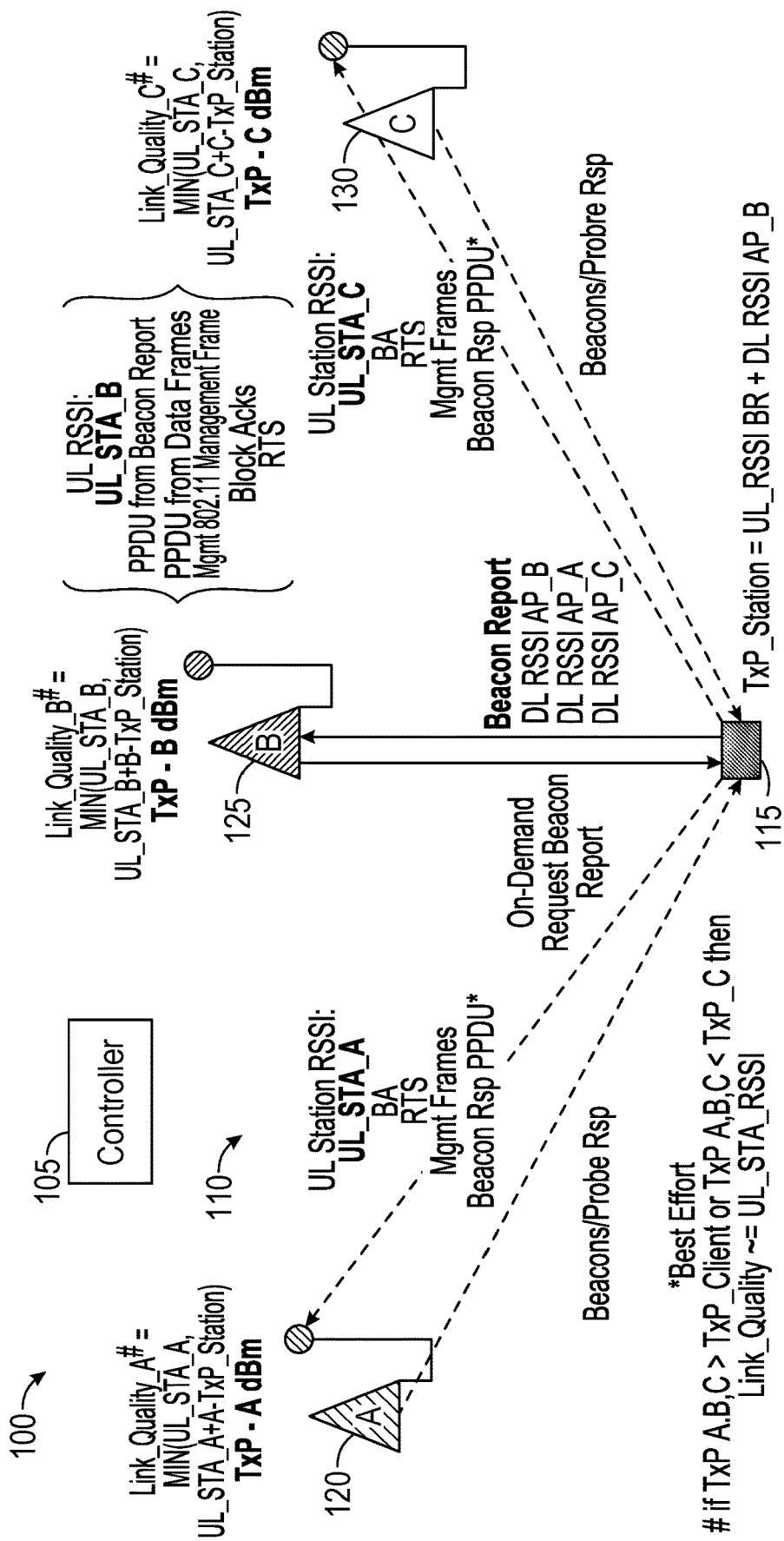
FIG. 1 is a block diagram of an operating environment.

Augmenting a neighbor report with uplink Received Signal Strength Indicators (RSSIs) may be provided. First, a conducted transmit power value of a client device may be determined. A plurality of RSSI uplink values respectively corresponding to a plurality of Access Points (APs) may then be determined. Next, a plurality of RSSI downlink values respectively corresponding to the plurality of APs may be determined based on the respective plurality of RSSI uplink values, a respective plurality of conducted transmit power values corresponding to the plurality of APs, and the conducted transmit power value of the client device. A plurality of quality metrics respectively corresponding to the plurality of APs may then be determined based on the determined plurality of RSSI uplink values and the determined plurality of RSSI downlink values. Then, a neighbor report may be optimized based on the plurality of quality metrics.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

Mobile client devices may need to roam to nearby APs sooner or later. A serving AP may send a neighbor report to alert the client device to neighboring APs in order to reduce the client device's overhead when actively scanning (e.g., fewer channels to scan) and/or passively scanning (e.g., channel list plus Timing Synchronization Function (TSF)). Furthermore, the value of a quality neighbor report may increase with the 6 GHz spectrum where it may be desired to suppress active scanning. However, the neighbor list may be coarse and neither the wireless infrastructure nor the client device may know which neighboring AP may be most promising in terms of "strongest Received Signal Strength Indicators (RSSIs)". In other words, given that the AP and the client device may have different transmit (TX) powers, numbers of antennas, and Multiple Input Multiple Output (MIMO) equalization/beamforming capabilities, both the client device perspective and AP perspective may need to be considered.

Accordingly, as described in greater detail below, consistent with embodiments of the disclosure, an AP quality metric may comprise for example, but is not limited to: min(RSSIuplink+10 log 10 (nAntennaAp/nSpatialStream), RSSIdownlink+10 log 10 (nAntennaClient/nSpatialStream)+(if SU is limiting and the AP always does Beamforming, then +10 log 10(nAntennaAP/nSpatialStream)) between itself and the client device. RSSIuplink may comprise the Received Signal Strength Indicator (RSSI) for the uplink, RSSIdownlink may comprise the RSSI for the down link, nAntennaAp may comprise the number of antenna on the AP, nSpatialStream may comprise the number of spatial streams, and SU may comprise single user. The AP with the highest quality metric may be the best AP or, if congested, then at least one of a few desirable APs. Embodiments of the disclosure may provide greater precision in selection and ordering of nearby (i.e., neighbor) APs, especially for client devices that support Multi-band Operations (MBO) and have active voice or video traffic, by leveraging the capabilities the APs.

Consistent with embodiments of the disclosure, APs may have a dedicated scanning radio. Among other things, the dedicated scanning radios may decode Physical Layer (PHY) Protocol Data Units (PPDUs) and may measure uplink RSSIs from client devices, for example, from control frames such as Request to Send (RTS) and Block Acknowledge (BA) and some management/data frames. A PPDU carrying management/data frames may have too high a Modulation and Coding Scheme (MCS) and/or too many Service Sets (SSs) for the scanning paths to decode the frame(s) in the PPDU; but even so, an identified RSSI may be extracted by: a) matching the receive (RX) PPDU timestamp against that of a closer AP that did decode the PPDU correctly; and/or b) extract the identity from adjacent frames such as RTS or a trigger frame for example and/or c) using the Trigger frame to constrain the MCS, number of SSs (and even bandwidth) so that the PPDU sent in response to the Trigger frame is receivable by the scanning radios.

FIG. 1 shows an operating environment 100. As shown in FIG. 1, operating environment 100 may comprise a controller 105, a plurality of Access Points (APs) 110, and a client device 115. Plurality of APs 110 may comprise a first AP 120, a second AP 125, and a third AP 130. Plurality of APs 110 may allow client device 115 to connect to a wired network. Controller 102 may access and control plurality of APs 110 in order to provide client devices (e.g., client device 115) roaming within operating environment 100 with a Wireless Local Area Network (WLAN). Operating environment 100 may use scanning radios at respective neighboring APs (e.g., plurality of APs 110) to measure fresh uplink RSSIs from client device 115, and use these neighboring uplink RSSIs, in conjunction with AP transmit powers and an estimate of client device 115's nominal transmit power to refine a neighbor report (included directly, or prune/sort the elements for the neighboring APs).

Client device 115, first AP 120, second AP 125, and third AP 130 may use beamforming. Beamforming may comprise a signal processing technique that may be used in sensor arrays comprising a plurality of antennas for directional signal transmission or reception. Client device 115 may comprise, but is not limited to, a cable modem, a cellular base station, a tablet device, a mobile device, a smart phone, a telephone, a remote control device, a set-top box, a digital video recorder, an internet of things (IoT) device, a personal computer, a network computer, a mainframe, a router, or other similar microcomputer-based device.

Elements of operating environment 100 (i.e., controller 105, plurality of APs 110, and client device 115) may be practiced in hardware and/or in software (including firmware, resident software, micro-code, etc.) or in any other circuits or systems. Elements of operating environment 100 may be practiced in electrical circuits comprising discrete electronic elements, packaged or integrated electronic chips containing logic gates, a circuit utilizing a microprocessor, or on a single chip containing electronic elements or microprocessors. Elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, elements of operating environment 100 may be practiced in a computing device 300.

Figure 2:
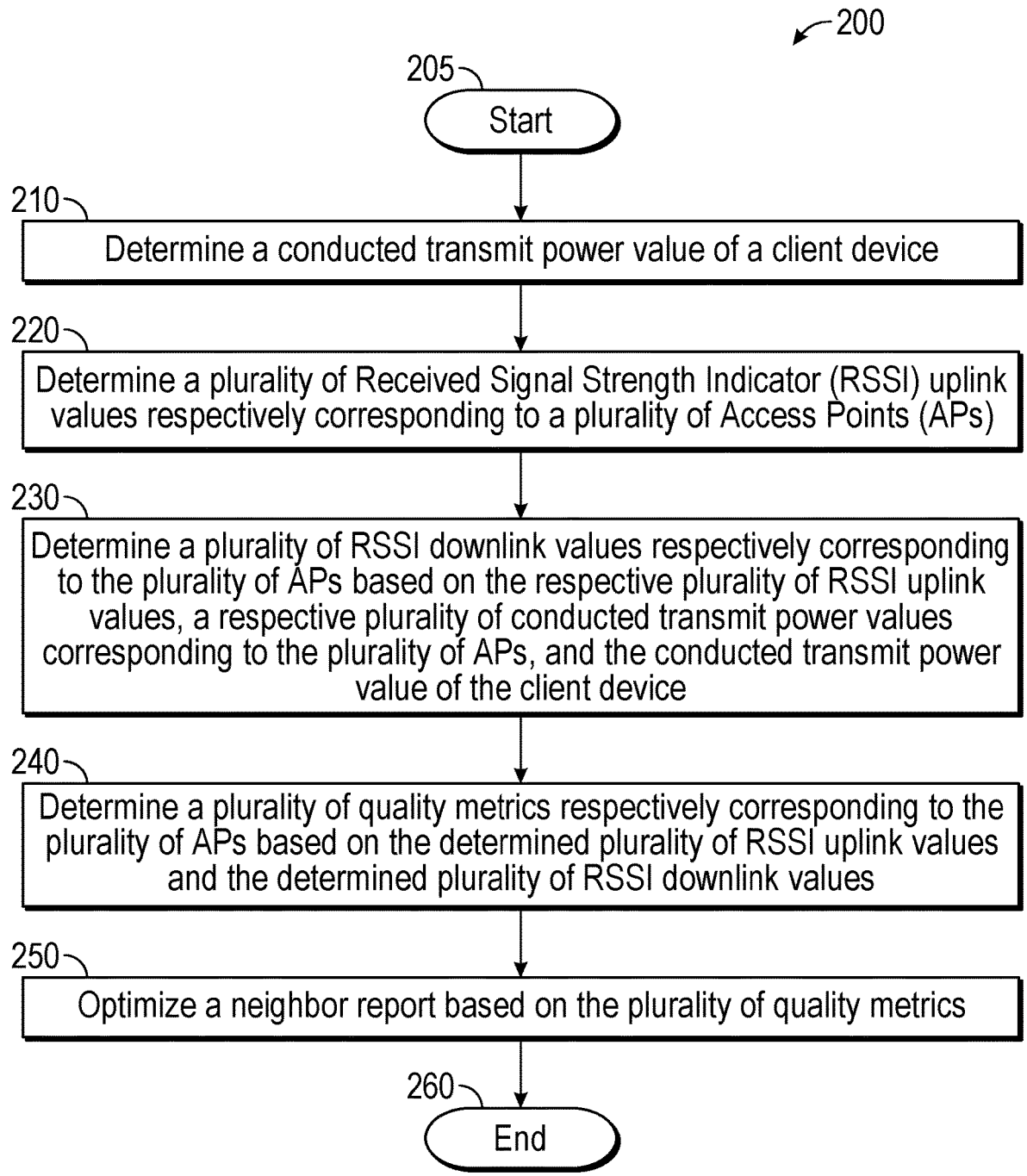
FIG. 2 is a flow chart of a method for augmenting a neighbor report with uplink Received Signal Strength Indicators (RSSIs)

FIG. 2 is a flow chart setting forth the general stages involved in a method 200 consistent with an embodiment of the disclosure for augmenting a neighbor report with uplink Received Signal Strength Indicators (RSSIs). Method 200 may be implemented using controller 105 as described in more detail above with respect to FIG. 1. Ways to implement the stages of method 200 will be described in greater detail below.

Method 200 may begin at starting block 205 and proceed to stage 210 where controller 105 may determine a conducted transmit power value of client device 115. For example, controller 105 may estimate client device 115's conducted transmit power value (i.e., TXPclient), per band for example, using one or a (possibly time-varying) combination of the following processes using the most recent estimate or some time-series filtering of the results.

As a first process, controller 105 may estimate client device 115's conducted transmit power value as a priori determined nominal transmit (TX) power. For example, controller 105 may set client device 115's conducted transmit power value to a predetermined value, for example, 15 dBm at 5 GHz or 18 dBm at 2.4 GHz.

As a second process, controller 105 may estimate client device 115's conducted transmit power value from a beacon report using many APs (e.g., plurality of APs 110), including APs on the same channel as an AP that client device 115 is associated with (e.g., second AP 125, i.e., AP B). For example, when client device 115 associates with second AP 125, client device 115 may send a beacon report with the downlink RSSIs (e.g. from beacons or probe responses) from plurality of APs 110 (e.g., APs A/B/C) to second AP 125. Controller 105 may know the conducted TX power of plurality of APs 110's beacons or probe responses. Second AP 125 (and maybe first AP 120 and third AP 130) may also measure the RSSI of the PPDU containing the beacon report. Then controller 105 may have the uplink RSSI from client device 115 to second AP 125 (and optionally first AP 120 and third AP 130), and also the downlink RSSI from each of plurality of APs 110 to client device 115. Any difference can be ascribed to the difference in conducted TX powers. If more than second AP 125 sniffed the beacon report, then controller 105 may perform averaging/estimation. In this way, controller 105 may estimate the conducted transmit power value (i.e., TXPclient) of client device 115. However, the beacon report may include stale measurements that may make this estimate less reliable.

As a third process, controller 105 may estimate client device 115's conducted transmit power value from a beacon report of the associated AP (e.g., second AP 125). For example, at one time early in the association, second AP 125 may request a beacon report from client device 115 for second AP 125 itself. This may be performed quickly by client device 115 so the measurement may not be stale. As with the above second process for estimating client device 115's conducted transmit power value, controller 105 or second AP 125 may then estimate TXPclient=TXP_AP+ RSSIuplink[of PPDU carrying Beacon Report frame]− RSSIdownlink[carried within Beacon Report frame]. This may be an estimate because it may depend on the precision of client device 115's RSSI. Heuristics and Machine Learning (ML) may be used to identify problematic clients (e.g., by tracking Organizational Unique Identifiers (OUIs)) where this process is not advised, or advised with averaging over multiple exchanges when client device 115 is at different distances from second AP 125.

UL TB PPDUs (Orthogonal Frequency Division Multiple Access (OFDMA), MU-MIMO, or a mix of both) may be used to obtain RSSIs, with the client device using a suitable (but not necessarily maximum) conducted transmit power. The protocol specifies the AP's DL TX power and the AP's desired target RSSI due to the client device's UL transmission ("UL Target RSSI"), then the client "silently" varies its transmit power to achieve this target RSSI. To work around the client "silently" varying its transmit power, one of the following two procedures may be used. With a first procedure, if the AP sets the UL Target RSSI to 31, that commands the client to use its maximum TX power. The maximum value may be MCS-dependent (lower at higher MCSs), so the AP should have requested the client device to transmit using a suitably low MCS (e.g. in high density MCS0-MCSn might be discouraged, so the AP might request MCSn+1 or similar). As a second procedure, if the AP sets the UL Target RSSI to other than 31, there are ways for the client device to also signal its headroom: i.e. the additional power it could use to send its PPDU at the specified MCS. The AP can add this headroom value to the RSSI to get the RSSI if the client had transmitted at its maximum power. Also, like above, the AP should have requested the client device to transmit using a suitably low MCS. If one of these two procedures is combined with the aforementioned three processes, then the client device's maximum TX power can also be learned. As a fourth process, the client device may include its Power Capability element at association.

From stage 210, where controller 105 determines the conducted transmit power value of client device 115, method 200 may advance to stage 220 where controller 105 may determine a plurality of Received Signal Strength Indicator (RSSI) uplink values respectively corresponding to plurality of APs 110. For example, client device 115 may move from one place in operating environment 100 to another place in operating environment 100. Client device 115 may transmit (e.g., on all bands) and may be heard by plurality of APs 110 (i.e., AP A/B/C) that may measure RSSIuplink_A/B/C per band and now have fresh uplink RSSIs. Controller 105 may now have the plurality of RSSI uplink values respectively corresponding to plurality of APs 110. Consistent with embodiments of the disclosure, RSSIs between client device 115 and any of plurality of APs 110 on one band may be modified to be estimates of RSSI on another band when RSSIs between client device 115 and any of plurality of APs 110 on the other band are not available, by applying, for example, a $10*\log 10(f1/f2)$ correction term.

Once controller 105 determines the plurality of RSSI uplink values in stage 220, method 200 may continue to stage 230 where controller 105 may determine a plurality of RSSI downlink values respectively corresponding to plurality of APs 110 based on the respective plurality of RSSI uplink values, a respective plurality of conducted transmit power values corresponding to plurality of APs 110, and the conducted transmit power value of client device 115. For example, controller 105 may estimate fresh downlink RSSIs per band via RSSIdownlink_A/B/C=RSSIuplink_A/B/C−TXPclient+TXP_AP_A/B/C. In the aforementioned equation: i) the plurality of RSSI downlink values respectively corresponding to plurality of APs 110 may comprise RSSIdownlink_A/B/C; ii) the conducted transmit power value of client device 115 may comprise TXPclient; and iii) the respective plurality of conducted transmit power values corresponding to plurality of APs 110 may comprise TXP_AP_A/B/C.

After controller 105 determines the plurality of RSSI downlink values in stage 230, method 200 may proceed to stage 240 where controller 105 may determine a plurality of quality metrics respectively corresponding to plurality of APs 110 based on the determined plurality of RSSI uplink values and the determined plurality of RSSI downlink values. For example, controller 105 may determine the quality of a bidirectional link between each of plurality of APs 110 and client device 115 via the following: min (RSSIuplink_A/B/C, RSSIdownlink_A/B/C). In the aforementioned function, RSSIdownlink_A/B/C may be determined by the estimation described above with respect to stage 230. If TXP_AP_A/B/C is always greater than TXPclient or always less than TXPclient, then the AP quality metric may be equivalent to the uplink RSSIs. However, if there are differences (e.g., due to Radio Resource Management (RRM) and Flexible Radio Assignment (FRA)), then the AP quality metric may be of more value. Accordingly, a quality metric for each of plurality of APs 110 may comprise:

i) Quality Metric for first AP 120=min (RSSI uplink value for first AP 120, RSSI uplink value for first AP 120+TX Power for first AP 120−TX Power for client device 115);

ii) Quality Metric for second AP 125=min (RSSI uplink value for second AP 125, RSSI uplink value for second AP 125+TX Power for second AP 125−TX Power for client device 115); and iii) Quality Metric for third AP 130=min (RSSI uplink value for third AP 130, RSSI uplink value for third AP 130+TX Power for third AP 130−TX Power for client device 115).

The aforementioned quality metric may be enhanced by incorporating antenna, spatial stream, and beamforming information per band. For example, the quality metric may be enhanced by incorporating the number of RX antennas, if unicast/broadcast (especially the beacon) is limiting rate at range, and/or if beamforming is used almost exclusively to client device 115. In terms of RX antennas, there may be Maximal Ratio Combining (MRC)/MIMO equalization gains of $10*\log 10$(number of RX antennas/number of spatial streams). In terms of TX antennas with beamforming when not limited by broadcast performance, the gains may be $10*\log 10$(number of TX antennas/number of spatial streams). This may lead to an enhanced quality metric of: min(RSSIuplink+$10 \log 10$(nAntennaAp/nSpatialStream), RSSIdownlink+$10 \log 10$(nAntennaClient/nSpatialStream)+(if SU is limiting and the AP always does Beamforming, then +$10 \log 10$(nAntennaAp/nSpatialStream)).

In addition, the quality metric may be further enhanced by combining it with the measured noise level per band to convert it to an Signal-to-Noise Ratio (SINR) per band. This SINR-related quality metric may be still further enhanced by converting the SINR to a throughput using an a priori mapping function, then the throughput may be de-rated by the measured congestion per band, so that the final metric may represent the expected throughput of client device 115 when associated to any of plurality of APs 110 per band. For instance, controller 105 may determine the min(estimated Uplink (UL) throughput, estimated Downlink (DL) throughput) or estimated UL+DL throughput. UL/DL throughput can be estimated as (proportion of channel not consumed already)*(expected UL/DL PHY rate as a function of UL/DL RSSI, antenna counts, beamforming, background noise+interference level, and estimated Packet Error Rate (PER) and measured retry rate). Various waterfall-curve based estimates and approximations to determine this function may be used. Consistent with embodiments of the disclosure, any of the aforementioned quality metrics may be calculated for each radio (i.e., band) of plurality of APs 110. TXPclient, RSSIuplink, and RSSIdownlink may be measured/estimated for each distinct band using the above processes.

From stage 240, where controller 105 determines the plurality of quality metrics, method 200 may advance to stage 250 where controller 105 may optimize a neighbor report based on the plurality of quality metrics. For example, the neighbor report may include, within a vendor specific sub-element of the neighbor report element for a neighboring AP, the uplink RSSI and downlink RSSIs (or just the AP quality metric) of the neighboring AP. The neighbor report may be ordered by decreasing AP quality metrics. Another optimization may include deleting a neighboring AP from the neighbor report if the AP's quality metric is below a threshold. A neighboring AP may be deleted from the neighbor report if the AP's quality metric is Q below the quality metric of the AP with the best AP quality metric, where Q may be a configured value. Yet another optimization may comprise deleting a neighboring AP from the neighbor report if the AP's quality metric is below a threshold, and if the AP does not have one of the N best AP quality metrics. A neighboring AP may be deleted from the neighbor list if the AP's quality metric is not one of the N best AP quality metrics. Once controller 105 optimizes the neighbor report based on the plurality of quality metrics in stage 250, method 200 may then end at stage 260.

Consistent with embodiments of the disclosure, while on channel the scanning radios may sniff client device RSSIs sent in response to Block ACK Request (BAR) frames(s) sent by one or more collocated or nearby radios. If the scanning radio is already enabled, then these uplink RSSIs may already be available to further optimize the neighbor report. Furthermore, the scanning radio of a neighboring AP might use different/inferior antennas to the serving radio or the scanning radio of another neighboring AP. For this case, the RSSI may be corrected before comparison with other APs when further optimizing the neighbor report. Trigger frames can also be used to solicit client device RSSI, while constraining modulation parameter usage to enhance measurement with any frames, including Data, QoS Null, and management frames.

As mentioned above, the uplink measurements taken into account may be the most recent obtained from a client (e.g., client device 115). The AP may assign a "freshness" weight to the uplink measurements from the neighbors based on the RX time-stamps. Also, when a client device sends a neighbor request, if neighbors do not have recent uplink measurements from the client device, a response to the request may be suppressed and instead, a location determination system style measurement may be triggered among the neighbor monitor radios to obtain fresh uplink measurements. After this measurement phase, the data may then be compiled into an up-to-date neighbor report and transmitted. As another alternative, when the serving AP detects fading client RSSI, it may actively initiate a HALO-style measurement in order to have the neighbor response ready in hand once the client requests it.

Figure 3:
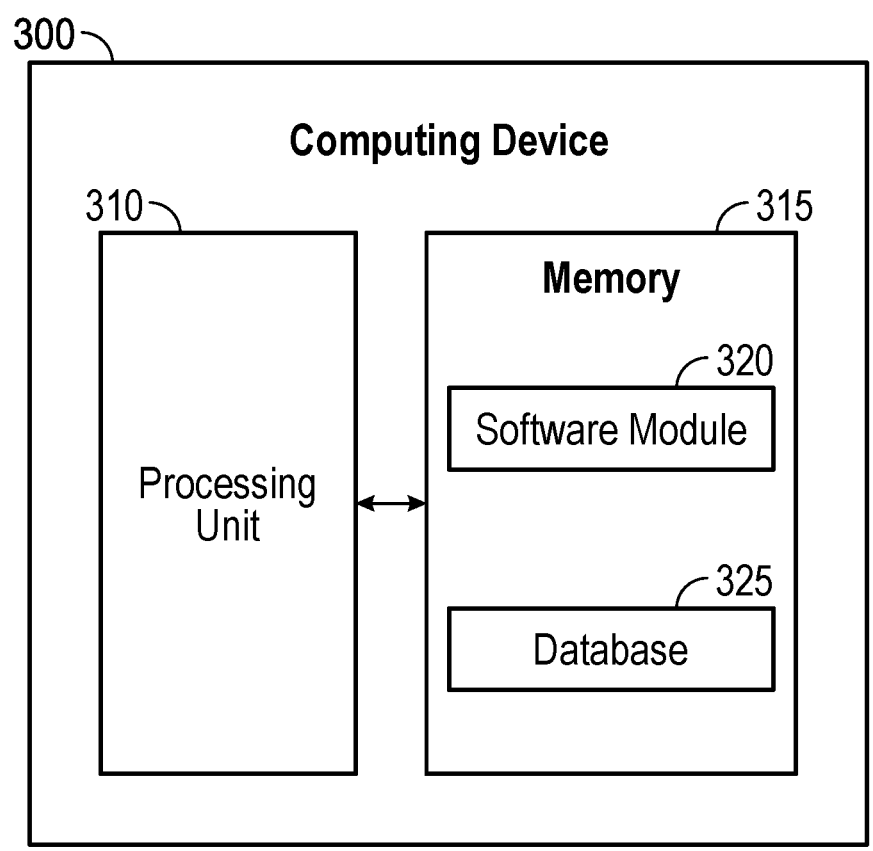
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for augmenting a neighbor report with uplink Received Signal Strength Indicators (RSSIs), including for example, any one or more of the stages from method 200 described above with respect to FIG. 2. Computing device 300, for example, may provide an operating environment for controller 105, plurality of APs 110, and client device 115. Controller 105, plurality of APs 110, and client device 115 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   determining, by a controller, a conducted transmit power value of a client device;
   determining a plurality of Received Signal Strength Indicator (RSSI) uplink values respectively corresponding to a plurality of Access Points (APs);
   determining a plurality of RSSI downlink values respectively corresponding to the plurality of APs based on the respective plurality of RSSI uplink values, a respective plurality of conducted transmit power values corresponding to the plurality of APs, and the conducted transmit power value of the client device;
   determining a plurality of quality metrics respectively corresponding to the plurality of APs based on the determined plurality of RSSI uplink values and the determined plurality of RSSI downlink values; and
   optimizing a neighbor report based on the plurality of quality metrics.

2. The method of claim 1, wherein determining the conducted transmit power value of the client device comprises determining the conducted transmit power value to be a predetermined value.

3. The method of claim 1, wherein determining the conducted transmit power value of the client device comprises estimating the conducted transmit power value of the client device based on averaging data corresponding to the plurality of APs contained in a beacon report provided by the client device.

4. The method of claim 1, wherein determining the conducted transmit power value of the client device comprises determining the conducted transmit power value of the client device from a beacon report requested from the client device by a one of the plurality of APs that the client device is associated with.

5. The method of claim 1, wherein determining the plurality of quality metrics respectively corresponding to the plurality of APs comprises determining the plurality of quality metrics respectively corresponding to the plurality of APs based further upon at least one of the following: if beamforming is used, a number of antenna, and a number of spatial streams corresponding to at least one of the following: the client device and at least one of the plurality of APs.

6. The method of claim 1, wherein determining the plurality of quality metrics respectively corresponding to the plurality of APs comprises determining the plurality of quality metrics respectively corresponding to the plurality of APs based further upon a Signal-to-Noise ratio (SINR) derived from a measured noise level.

7. The method of claim 6, wherein determining the plurality of quality metrics respectively corresponding to the plurality of APs comprises determining the plurality of quality metrics respectively corresponding to the plurality of APs based further upon converting the SINR to a throughput and de-rating the throughput based upon a measured congestion.

8. The method of claim 1, wherein optimizing the neighbor report comprises ordering neighboring APs in the neighbor report by decreasing AP quality metric.

9. The method of claim 1, wherein optimizing the neighbor report comprises deleting a neighboring AP from the neighbor report when the neighboring AP's quality metric is below a predetermined threshold.

10. The method of claim 1, wherein optimizing the neighbor report comprises deleting a neighboring AP from the neighbor report when the neighboring AP's quality metric is a predetermined value below a quality metric of an AP with a best quality metric of the plurality of quality metrics.

11. The method of claim 1, wherein optimizing the neighbor report comprises deleting a neighboring AP from the neighbor report when the neighboring AP does not have one of the N best AP quality metrics of the plurality of quality metrics, where N is a predetermined integer.

12. The method of claim 1, wherein optimizing the neighbor report comprises deleting a neighboring AP from the neighbor report when the neighboring AP's quality metric is below a predetermined threshold and when the neighboring AP does not have one of the N best AP quality metrics of the plurality of quality metrics, where N is a predetermined integer.

13. The method of claim 1, further comprising providing the neighbor report to the client device.

14. A system comprising:
   a memory storage; and
   a processing unit coupled to the memory storage, wherein the processing unit is operative to:
      determine a conducted transmit power value of a client device;
      determine a plurality of Received Signal Strength Indicator (RSSI) uplink values respectively corresponding to a plurality of Access Points (APs);

determine a plurality of RSSI downlink values respectively corresponding to the plurality of APs based on the respective plurality of RSSI uplink values, a respective plurality of conducted transmit power values corresponding to the plurality of APs, and the conducted transmit power value of the client device;

determine a plurality of quality metrics respectively corresponding to the plurality of APs based on the determined plurality of RSSI uplink values and the determined plurality of RSSI downlink values; and optimize a neighbor report based on the plurality of quality metrics.

15. The system of claim 14, wherein the processing unit being operative to determine the conducted transmit power value of the client device comprises the processing unit being operative to estimate the conducted transmit power value of the client device based on averaging data corresponding to the plurality of APs contained in a beacon report provided by the client device.

16. The system of claim 14, wherein the processing unit being operative to determine the conducted transmit power value of the client device comprises the processing unit being operative to determine the conducted transmit power value of the client device from a beacon report requested from the client device by a one of the plurality of APs that the client device is associated with.

17. A non-transitory computer-readable medium that stores a set of instructions which when executed perform a method comprising:

determining, by a controller, a conducted transmit power value of a client device;

determining a plurality of Received Signal Strength Indicator (RSSI) uplink values respectively corresponding to a plurality of Access Points (APs);

determining a plurality of RSSI downlink values respectively corresponding to the plurality of APs based on the respective plurality of RSSI uplink values, a respective plurality of conducted transmit power values corresponding to the plurality of APs, and the conducted transmit power value of the client device;

determining a plurality of quality metrics respectively corresponding to the plurality of APs based on the determined plurality of RSSI uplink values and the determined plurality of RSSI downlink values; and optimizing a neighbor report based on the plurality of quality metrics.

18. The non-transitory computer-readable medium of claim 17, wherein determining the plurality of quality metrics respectively corresponding to the plurality of APs comprises determining the plurality of quality metrics respectively corresponding to the plurality of APs based further upon at least one of the following: if beamforming is used, a number of antenna, and a number of spatial streams corresponding to at least one of the following: the client device and at least one of the plurality of APs.

19. The non-transitory computer-readable medium of claim 17, wherein determining the plurality of quality metrics respectively corresponding to the plurality of APs comprises determining the plurality of quality metrics respectively corresponding to the plurality of APs based further upon a Signal-to-Noise ratio (SINR) derived from a measured noise level.

20. The non-transitory computer-readable medium of claim 19, wherein determining the plurality of quality metrics respectively corresponding to the plurality of APs comprises determining the plurality of quality metrics respectively corresponding to the plurality of APs based further upon converting the SINR to a throughput and de-rating the throughput based upon a measured congestion.

* * * * *